Patented May 1, 1951

2,551,481

UNITED STATES PATENT OFFICE 2,551,481

HARD SYNTHETIC COPOLYMER

Wilfred K. Wilson, Springfield, Mass., assignor to Shawinigan Resins Corporation, Springfield, Mass., a corporation of Massachusetts No Drawing. Application March 27, 1950, Serial No. 152,259

5 Claims. (Cl. 260—78.5)

This invention relates to the copolymerization of vinyl esters with the condensation product of an unsaturated dibasic acid, a glycol and cyclohexanol.

Various methods have been proposed to increase the softening point of vinyl esters in order to increase their general utility. The suggested processes usually try to cross-link the polyvinyl esters after polymerization. These processes have not been found to be generally applicable.

It is an object of this invention to provide a new hard composition of matter and a process for preparing the same. A particular object is to provide compositions of matter from vinyl esters and a condensation product of cyclohexanol, a glycol and an unsaturated dibasic acid which are characterized by high softening points, high melt viscosities and insolubility in the usual vinyl ester solvents.

These and other objects are attained according to this invention by reacting an unsaturated dibasic acid with cyclohexanol to form a mono ester, further treating this product with a glycol to react the remaining carboxyl group with the hydroxyl group of the polyhydroxy alcohol. This homogeneous product is then copolymerized with a vinyl ester. By following this procedure a hard copolymer is obtained. For example, the product shows no deformation at temperatures below 65° C.

The following examples are illustrative of the present invention. Where parts are given, they are parts by weight.

Example I 98 parts of maleic anhydride were heated with 100 parts of cyclohexanol. At 110° C. the reaction became exothermic, forming the monocyclohexylmaleate. After holding the solution at 125° C. for 15 minutes to complete the reaction, the following were added:

34.1 parts of ethylene glycol
150.0 parts of benzene
1.0 part of concentrated sulfuric acid After refluxing for 3 hours, 17 cc. of water had been separated. The material was then heated until 135 parts of benzene had been removed, and then cooled. The material was washed twice with water, neutralized with sodium bicarbonate, and washed twice more with water. The product was heated to drive off the emulsified water, and then cooled.

Example II 250 parts of the product of Example I were added to 750 parts of purified monovinyl acetate, 1000 parts of water, 0.6 part of polyvinyl alcohol containing 10% residual acyl groups, 0.1 part of sodium bicarbonate and 0.5 part of hydrogen peroxide. This mixture was agitated at reflux temperature for 100 minutes. The polymerized product was in bead form. The bead polymer was easily separated from the water by centrifuging the slurry.

The deformation temperature was determined in the following way:

A specimen was molded from the bead polymer formed, using heat and high pressure, which measured 3" x 1" x .025". This specimen was immersed in a mineral oil bath in which the temperature was increased 3° C. per minute. The temperature at which the specimen no longer recovered, after it was bent by pressing it against the side of the bath, was taken as the deformation temperature. With polyvinyl acetate this test shows that it deforms at 44° C. The product of this example did not recover at 76° C.

Example III 10 parts of the product of Example I was added to 40 parts of gum arabic, 2.0 parts of dodecyl benzene sodium sulfonate, 0.5 part of potassium persulfate, 0.5 part of zinc oxide, 540 parts of refined monovinyl acetate and 470 parts of water.

This mixture was heated at reflux temperature with rapid agitation for 120 minutes with a total of 0.12 part of zinc sulfoxite (the reaction product of sodium bisulfite and formaldehyde) being added in small portions throughout the polymerization period. The product was a viscous emulsion of the very finely divided copolymer in water. This emulsion was particularly adapted for bonding wood to wood because of its resistance to flow at elevated temperatures.

When 20 cc. of this emulsion was diluted with 40 cc. of water and poured into 150 cc. of ethanol, a clear thick gel was obtained thus showing the insolubility of the internal phase in ethanol.

Many variations of this invention may be made without departing from the scope and spirit thereof. Thus, in place of vinyl acetate which was used in the examples, other vinyl esters may be used as, for example, vinyl butyrate, vinyl formate, vinyl propionate, vinyl valerate, vinyl hexoate and mixtures thereof.

The amount of the polymerizable condensation product used with the vinyl ester can be varied widely. In Example II, 25 parts per 75 parts of vinyl acetate substantially doubled the deformation temperature of vinyl acetate alone. In Example III, as low as 10 parts per 540 parts of vinyl acetate caused a large modification in the usual properties of polyvinyl acetate. The amount used depends upon the properties of the product desired, for example, if a higher softening point is desired, a larger amount of the condensation product must be used.

The other polymerizable compound may be formed starting with any α,β enthylenically unsaturated dicarboxylic acid such as fumaric acid, maleic acid, citraconic acid, mesaconic acid and ethidene malonic acids and reacting cyclohexanol with it, mol for mol.

Two mols of this mono ester are then reacted with one mol of polyhydric alcohol such as ethylene glycol, diethylene glycol, triethylene glycol, propylene glycol, butanediol-2,3 or three or more mols of the mono ester with glycerol, pentaerythritol, sorbitol and mannitol.

The mono ester of the unsaturated dibasic acid is very easily formed if the acid can be obtained in the anhydride form. It will then combine with a primary or secondary alcohol without the aid of a catalyst and under mild conditions. As exemplified in Example I in the reaction between the mono ester and the polyhydroxy compound, it is preferred to remove the water formed in the esterification.

This reaction can be carried out in many ways and in various steps to obtain the same polymerizable compound. The polymerizable compound has the following configuration when made as in Example I:

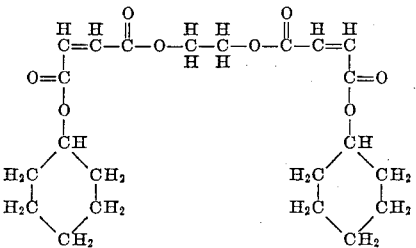

This and similar compounds, it will be noted, contain no residual carboxyl or hydroxyl groups and is a homogeneous chemical entity. It produces a true copolymer with vinyl esters in this invention.

This compound is preferred over other similar compounds of the same type because it is highly effective in small amounts and it produces extremely hard copolymers with vinyl esters. When other acids or glycols are substituted in this particular configuration, larger amounts must be employed to obtain the same increase in tensile strength.

The copolymerization may be carried out in bulk, bead or emulsion form whichever is more convenient for the application. The polymerization may be carried out in a batch or continuous process. When a continuous process is used, all of the components must be added to the initial reaction vessel in a continuous or substantially continuous manner. The polymerization may be carried out at temperatures between 50–100° C. depending on the nature of the polymer desired. When necessary, pressure may be used to prevent the escape of volatile materials.

Various catalysts and mixtures of catalysts may be used for the copolymerization. In place of the potassium persulfate and hydrogen peroxide used in the examples, peracetic acid, potassium perborate, sodium perborate, benzoyl peroxide, sodium persulfate, urea peroxide and the like may be substituted. The amount employed depends upon the molecular weight of the product that is desired. Usually, the amount employed furnishes between 0.001 and 0.2 part of available oxygen per 100 parts of the mixture of monomers. When the catalysts used comprise a peroxide generating compound and a reducing agent, as in Example III, either or both may be added in portions or continuously throughout the polymerization.

For bead or emulsion polymerization, examples of the hydrophilic colloids which may be used include polyvinyl alcohol containing 4–23% acyl groups, gum arabic, sodium alginate, gum tragon, hydroxy ethyl cellulose, gum tragacanth and the like. Where very fine bead size or an emulsion is desired, wetting agents including the cationic, anionic or non-ionic may be used. For example, alkyl aryl sulfonates such as dodecyl benzene sodium sulfonate, alcohol sulfates, alkyl sulfonates, alkyl dimethyl benzyl ammonium chlorides, sodium sulfosuccinic esters and the like.

The foregoing description is given in illustration and not in limitation of the invention as set forth in the following claims.

What is claimed is:

1. A copolymer of a vinyl ester of an aliphatic acid containing from 2 to 6 carbon atoms and another polymerizable material resulting from the reaction of about 1 mol of a polyhydroxy alcohol with about 2 mols of a mono ester formed from cyclohexanol and an unsaturated dibasic carboxylic acid.

2. A copolymer according to claim 1 in which the unsaturated dibasic acid is maleic acid.

3. A copolymer according to claim 1 in which the polyhydroxy compound is ethylene glycol.

4. A copolymer according to claim 1 in which the vinyl ester is vinyl acetate.

5. A copolymer according to claim 1 in which the vinyl ester is vinyl acetate, the polyhydroxy compound is ethylene glycol and the unsaturated dibasic acid is maleic anhydride.

WILFRED K. WILSON.

REFERENCES CITED

The following references are of record in the file of this patent:

UNITED STATES PATENTS

| Number | Name | Date |
|---|---|---|
| 2,450,682 | Nordlander | Oct. 5, 1948 |
| 2,467,526 | Harris | Apr. 19, 1949 |